July 18, 1950 — R. CLINK — 2,515,591
FISH LURE
Filed Feb. 20, 1946
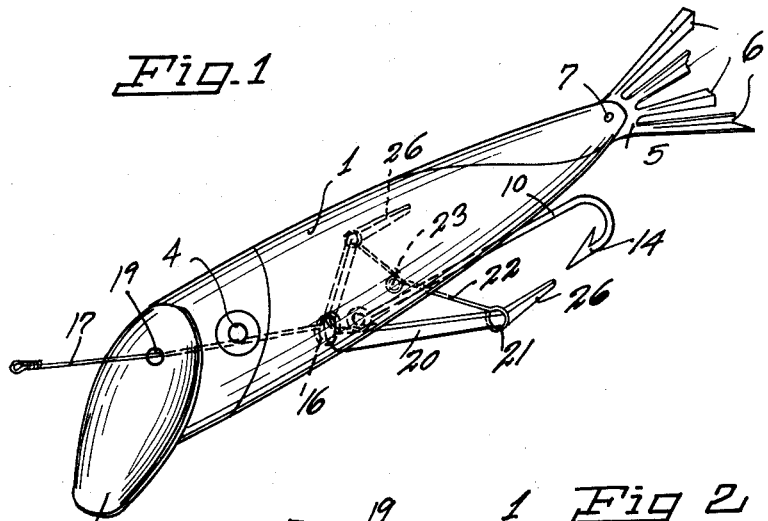
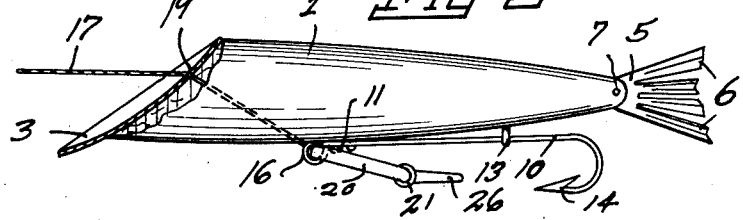
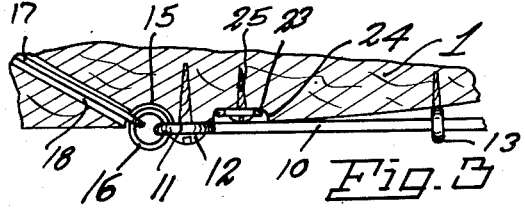
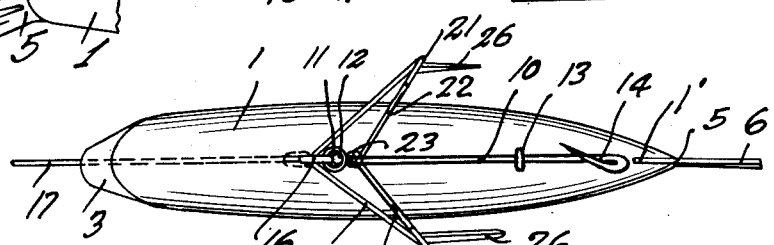
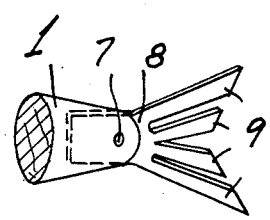
INVENTOR.
Ray Clink
BY
ATTORNEY Patented July 18, 1950

2,515,591

UNITED STATES PATENT OFFICE 2,515,591

FISH LURE

Ray Clink, Sedro Woolley, Wash.

Application February 20, 1946, Serial No. 648,874

2 Claims. (Cl. 43—42.26)

This invention relates to an artificial bait or fish lure and it is one object of the invention to provide a lure which has an appearance closely resembling the natural food of fish which it is desired to catch when it is in use and drawn through water.

Another object of the invention is to provide a lure having a tail so formed that as the lure is drawn through water ripples will be formed and thus attract the attention of fish to be caught.

Another object of the invention is to provide the lure with a spoon-shaped plate at its front end disposed at such an angle that as the lure is drawn through water it will cause the lure to be directed downwardly as it moves forwardly and thus kept under water.

Another object of the invention is to provide the lure with improved hooks so mounted that they will be kept in position for catching in the mouth of a fish attempting to take the bait.

Another object of the invention is to provide in connection with the hooks a strip of colored fabric so mounted that it will have portions extending longitudinally of the lure at opposite sides thereof and terminating in free end portions which may flutter as the lure is drawn forwardly through the water and attract a fish to the lure.

Another object of the invention is to provide a lure which is of simple construction and not liable to be broken when placed in a tackle box.

The invention is illustrated in the accompanying drawings wherein:

Fig. 1 is a perspective view of the improved lure.

Fig. 2 is a side view of the lure.

Fig. 3 is a fragmentary sectional view upon an enlarged scale taken longitudinally through the under portion of the lure.

Fig. 4 is a bottom plan view of the lure.

Fig. 5 is a side view of the tail portion of the lure.

Fig. 6 is a perspective view of a modified form of tail.

This improved fish lure has a body 1 which may be formed of wood or other suitable material. This body tapers towards its rear end and at the front end is formed with a dished surface against which is mounted a spoon-shaped metal plate 3 which has its lower or forward end portion projecting from the front end of the body. Since the plate is spoon-shaped and extends forwardly at a downward incline it will tend to direct the lure downwardly as it is drawn forwardly through water and cause the lure to have the appearance of a fish swimming close to the surface of the water. Eyes 4 are painted or otherwise provided at opposite sides of the head or front end portion of the body 1 and other portions of the body may be painted or otherwise marked to impart a natural appearance to the lure.

At its rear end the body is formed with a slot 1' to receive a tail 5 which is formed of sheet metal and slotted longitudinally to provide fins 6 which diverge rearwardly in a fan-shaped formation and are crimped longitudinally to provide transversely sloping surfaces causing light to be reflected and create glitter as the bait is drawn through water. A pin 7 secures the shank of the tail in the slot 1'. Instead of forming the tail of sheet metal it may be formed of rubber. A rubber tail 8 is shown in Figure 6 and while this tail has fins 9 it will be noted that they are flat. As this tail is formed of flexible rubber its fins may have transverse waving movement as the lure is drawn through water.

The lure is provided with a hook 10 which extends longitudinally thereof under the body 1 and is formed at the front end of its shank with an eye 11 through which a screw 12 is passed to secure the hook to the body. A screw eye 13 through which the shank of the hook passes prevents transverse movement of the hook and the barb 14 of the hook will be kept in position for catching in the mouth of a fish attempting to take the lure. While the hook has been shown with one barb it will be understood that a hook having additional barbs may be used. In front of the eye 11 is a recess 15 to receive a ring 16 carried by the eye and to this ring is attached a leader 17 which is threaded through a passage 18 extending forwardly at an upward incline from the recess and registering with an opening 19 formed in the plate 3. When a fishing line is attached to the leader 17 and pull exerted the lure may have limited transverse weaving movement as it is drawn forwardly and a natural appearance will be imparted to the lure.

In order to aid in attracting fishes to the lure there has been provided a strand 20 formed of colored fabric. While the cloth or yarn of which the strand 20 is formed is preferably colored red it may be other colors found desirable for attracting certain species of fish. This strand is passed through the ring 16 and the portions projecting from the opposite sides of the ring are extended rearwardly at an outward incline and passed through eyes 21 at the ends of the arms of a spreader 22. The spreader is formed of wire and the strand from which it is formed is bent midway its length to form an eye 23 which is secured in a recess 24 formed in the body by a screw 25. Terminal portions 26 of the fabric strand extend from the eyes 21 and as the lure is drawn forwardly through water these free portions 26 will flutter and serve very effectively to attract fish to the lure. When a fish attempts to take the bait it will be caught by the hook and securely held.

Having thus described the invention, what is claimed is:

1. A fish lure comprising a body tapered towards its rear end and having at its front end a concaved surface extending forwardly at a downward incline, a spoon-shaped plate mounted against the concaved surface and having its forward end projecting from the body, a hook under said body extending longitudinally thereof and having an eye at the front end of its shank, a fastener passing through said eye and into said body, a screw eye carried by said body rearwardly of the eye and through which the shank of the hook passes to maintain the hook longitudinally of the body, a ring carried by and projecting forwardly from said eye, and seated in a recess in the body, the body being formed with a passage extending forwardly at an upward incline and through said plate, a leader passing through said passage and having its rear end secured to said ring, a spreader having an eye secured to the body back of the eye of said hook and arms extending therefrom and projecting from opposite sides of the body at a rearward incline and formed with eyes at their ends, and a strand of fabric passed through the ring and having portions extending from opposite sides of the body at a rearward incline and threaded through the eyes of the spreader arms with free end portions of the fabric strand extending rearwardly from the spreader eyes.

2. A fish lure comprising a buoyant body tapered towards its rear end, a spoon mounted at the front end of said body, a hook under said body extending longitudinally thereof and having an eye at its front end, a fastener passing through said eye into said body, a ring carried by said eye and projecting forwardly therefrom, the body being formed with a recess rearwardly of the eye, a spreader formed from a metal strand bent to form an eye secured in the recess and arms projecting outwardly at a rearward incline from opposite sides of the body and provided with eyes at their outer ends, a strand of colored fabric having a portion midway its length passed through said ring and portions extending from opposite sides of the body and rearwardly through the eyes at the outer ends of the arms of said spreader and having free end portions projecting rearwardly therefrom, and a leader carried by said ring for connecting the lure with a fishing line.

RAY CLINK.

REFERENCES CITED

The following references are of record in the file of this patent:

UNITED STATES PATENTS

| Number | Name | Date |
| --- | --- | --- |
| 1,258,213 | Grothkopf | Mar. 5, 1918 |
| 1,489,043 | Reinewald | Apr. 1, 1924 |
| 1,553,933 | Dills | Sept. 15, 1925 |
| 1,734,883 | Shannon | Nov. 5, 1929 |
| 1,948,823 | Lissy | Feb. 27, 1934 |
| 2,125,030 | Ozburn | July 26, 1938 |
| 2,208,827 | Accetta | July 23, 1940 |
| 2,225,676 | White | Dec. 24, 1940 |
| 2,313,709 | Dunkelberger | Mar. 9, 1943 |